(12) United States Patent
Sembugamoorthy et al.

(10) Patent No.: US 8,176,146 B2
(45) Date of Patent: May 8, 2012

(54) PROVIDING ACCESS CONTROL LIST MANAGEMENT

(75) Inventors: Vel Sembugamoorthy, Atlanta, GA (US); Homayoun Torab, Snellville, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 801 days.

(21) Appl. No.: 11/956,935

(22) Filed: Dec. 14, 2007

(65) Prior Publication Data

US 2009/0119750 A1 May 7, 2009

(51) Int. Cl.
*G06F 15/16* (2006.01)
(52) U.S. Cl. ............... 709/219; 726/2; 726/3; 726/6; 726/27
(58) Field of Classification Search .............. 709/203, 709/217, 219; 726/2, 3, 6, 14, 22–27, 4, 726/1; 713/164, 167; 370/331
See application file for complete search history.

(56) References Cited

U.S. PATENT DOCUMENTS

| | | | | |
|---|---|---|---|---|
| 6,883,100 | B1* | 4/2005 | Elley et al. | 726/5 |
| 7,065,783 | B2* | 6/2006 | Rygaard | 726/4 |
| 7,243,148 | B2* | 7/2007 | Keir et al. | 709/224 |
| 7,281,270 | B2* | 10/2007 | Piesco et al. | 726/25 |
| 7,436,770 | B2* | 10/2008 | Sterne et al. | 370/235 |
| 2002/0166063 | A1* | 11/2002 | Lachman et al. | 713/200 |
| 2004/0261116 | A1* | 12/2004 | Mckeown et al. | 725/109 |
| 2007/0036110 | A1* | 2/2007 | Preguica | 370/331 |
| 2007/0289019 | A1* | 12/2007 | Lowrey | 726/24 |
| 2008/0172739 | A1* | 7/2008 | Nakae et al. | 726/22 |
| 2008/0282339 | A1* | 11/2008 | Nakae et al. | 726/13 |
| 2009/0172821 | A1* | 7/2009 | Daira et al. | 726/27 |
| 2011/0153697 | A1* | 6/2011 | Nickolov et al. | 707/827 |

* cited by examiner

*Primary Examiner* — Frantz Jean
(74) *Attorney, Agent, or Firm* — Parks IP Law LLC; Jennifer P. Medlin, Esq.

(57) ABSTRACT

Control list management may be provided. First, it may be detected that an event has occurred on a data network. Then, it may be determined, in response to the detected event, that a device on the data network needs to be provided with an access control list. Next, the access control list may be obtained from a database central to the data network. Then, the device may be provided with the obtained access control list.

18 Claims, 3 Drawing Sheets

PROVIDING ACCESS CONTROL LIST MANAGEMENT

BACKGROUND

Malicious security related attacks by hackers on communication networks result in disruption of communication services, financial losses, theft of proprietary information, and marring of service providers' brand names. This problem is serious and the number and sophistication of attacks are on the rise. It is important for the service providers to protect their networks with the latest techniques before the attack happens, and intervene to correct a problem and update preventive measures when attacks happen. Manual methods are error prone, time-consuming, and inadequate to timely protect service providers' networks.

"Triple-play" service introduction (e.g. voice, data, and video) in networks is a goal for service providers especially in the current market place. One significant technical goal for quick and successful triple-play service deployment and maintenance is quality of service (QoS) management and meeting service assurance demands from customers. As stated above, manual procedures to accomplish these tasks are not only error prone, but also time consuming.

SUMMARY

Consistent with embodiments of the present invention, systems and methods are disclosed for providing access control list management. First, it may be detected that an event threatening network security or service assurance has occurred on a communication network (e.g. a data network.) Then, it may be determined, in response to the detected event, that a new access control list may need to be installed on a device on the network or that an existing access control list may need to be modified. Next, the access control list or a template may be obtained from a database located centrally to the network and customized for a specific device. Then, the device may be installed with the access control list.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
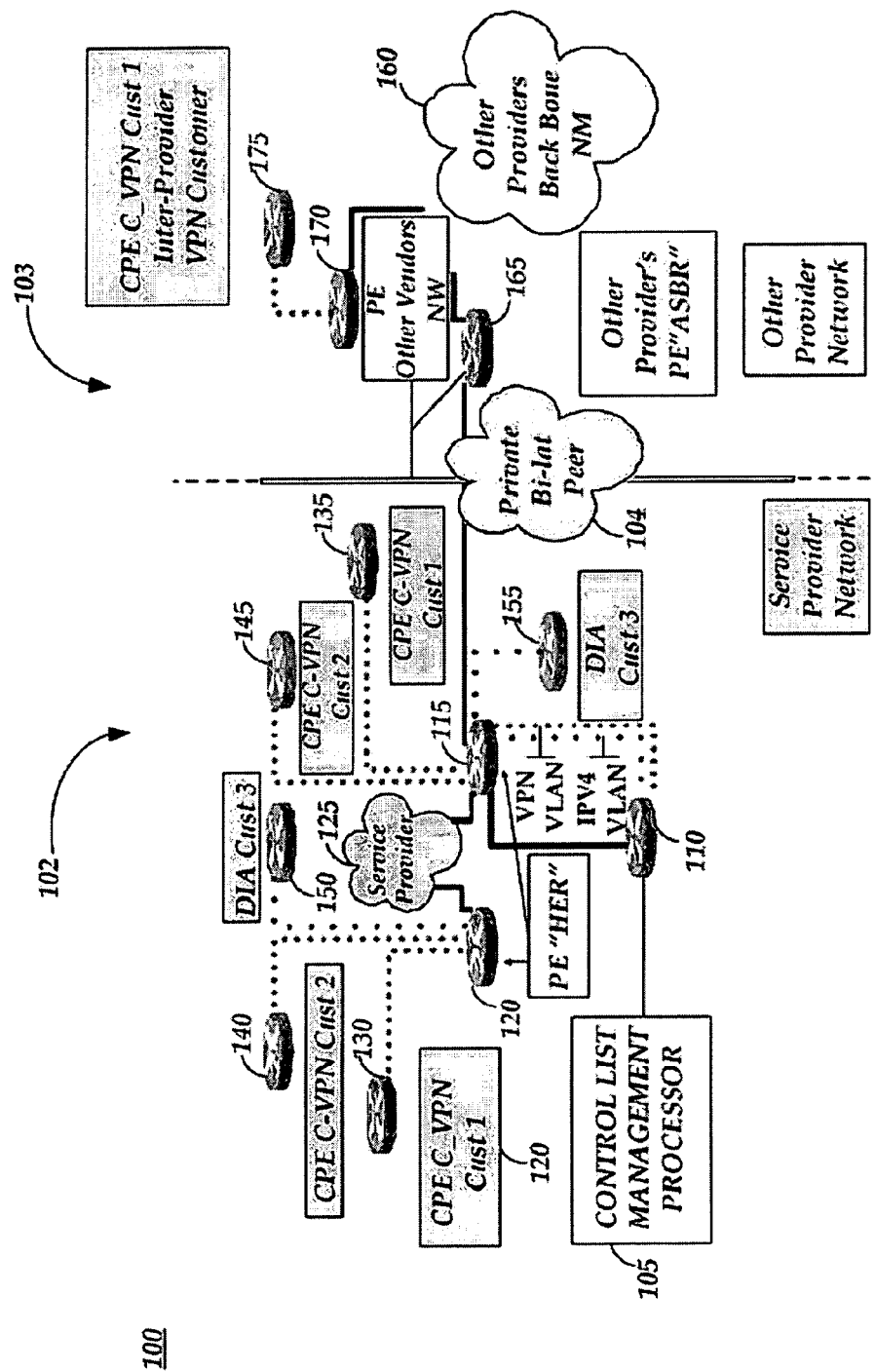
FIG. 1 is a block diagram of an exemplary communication system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, processes for quickly responding to security threats to a service provider's (i.e. data) network and managing quality of triple-play IP services may be provided. Access control to the service provider's network and service quality may be accomplished by managing access control lists (ACLs) in network elements. Embodiments of the invention may provide control list management capabilities and may provide comprehensive ways to control ACLs.

Embodiments consistent with the invention comprise a system for providing control list management. The system comprises a memory storage for maintaining a database and a processing unit coupled to the memory storage. The processing unit may be operative to detect that an event has occurred on a data network and to determine, in response to the detected event, that a device on the data network needs to be provided with an ACL. In addition, the processing unit may be operative to obtain the ACL from a database central to the data network and to provide the device with the obtained ACL.

Consistent with an embodiment of the present invention, the aforementioned memory, processing unit, and other components are implemented in a communications system, such as an exemplary communications system 100 of FIG. 1. Any suitable combination of hardware, software and/or firmware may be used to implement the memory, processing unit, or other components. By way of example, the memory, processing unit, or other components is implemented with a control list management processor 105, in combination with system 100. The aforementioned system and processors are examples and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 includes a service provider network 102 and other provider network 103 connected through a private bi-lateral peer 104. Service provider network 102 includes control list management processor 105, a shadow router 110, a first provider edge (PE) router 115, a second PE router 120, and a service provider backbone 125.

Furthermore, premise equipment (CPE), including, for example, routers are connected to service provider network 102. For example, service provider network 102 includes first customer CPEs 130 and 135, second customer CPEs 140 and 145, and third customer CPEs 150 and 155. First customer CPEs 130 and 135 are associated as a first virtual private network (VPN) and second customer CPEs 140 and 145 are associated with a second VPN. Third customer CPEs 150 and 155 are not associated with a VPN.

Other provider network 103 includes an other provider backbone 160 and other provider PE's 165 and 170. In addition, other provider network 103 includes an additional first customer CPE 175. First customer CPEs 130, 135, and 175 may be associated as an "interprovider VPN", which comprises an interaction between service provider network 102 and other service provider network 103. An interprovider VPN is used to support sharing VPN information across two or more carrier's networks. This allows the service provider to support customer VPN networks, for example, outside the service provider's franchise or region.

Shadow router 110 is connected to first PE router 115 via a single "Gig E" interface. This way, shadow router 110 can use any operating system needed to support new functionality without posing a threat to the core network interior gateway protocol (IGP) or border gateway protocol (BGP) function. The physical Gig E interface has three virtual local areas networks (VLANs) associated with it: i) one for IPV4 Internet traffic VLAN 330; ii) one for VPN-V4 traffic (VPN, VLAN 340); and iii) one for internal service provider traffic (VLAN 350). First PE router 115 is peered to a virtual router redundancy (VRR)-VPN route reflector so first PE router 115 has information about all MVPN customer routes.

These routes are filtered to prevent unneeded customer specific routes from entering first PE router 115's routing table. Only/32 management loop back addresses assigned to customer CPEs will be allowed in first PE router 115's management VPN VRF table (example 10.255.247.7./32). All other PE routers in service provider network 102 communicate with shadow router 110 via service provider backbone 125.

First PE router 115 and second PE router 120 provide performance measurement access, for example, to: i) first customer CPEs 130 and 135 via WAN interface addresses proximal to the CPE; ii) in region VPN customers (i.e. second customer CPEs 140 and 145); and 3) in and out-of-region customers using the MVPN (first customer CPEs 130 and 135 plus CPE 175.) Shadow router 110 can reach the CPE devices via static routes. Since all CPEs have management addresses derived from, for example, the 10.160.0.0/14 range. The static routes can be summarized to control access to sensitive routes.

To reach non-VPN CPEs such as associated with Dedicated Internet Access (DIA) routers, internal traffic VLAN 330 is provisioned between shadow router 110 and first PE router 115. This VLAN can support IPV4 addressing. Since each non-VPN managed CPE has no loopback interface, management performance traffic can be directed to the physical WAN interface proximal on the DIA CPE router. This, for example, is how simple network management protocol (SNMP) functions are performed conventionally. Each WAN address is assigned by the service provider from globally unique address space. Further, these addresses come from a central pool of addresses. Thus, these routes can also be summarized for management access from shadow router 110 located within system 100. CPEs belonging to service provider customers not within the service provider network 102 will be reached using the MVPN extended into other provider's network 103.

Figure 2:
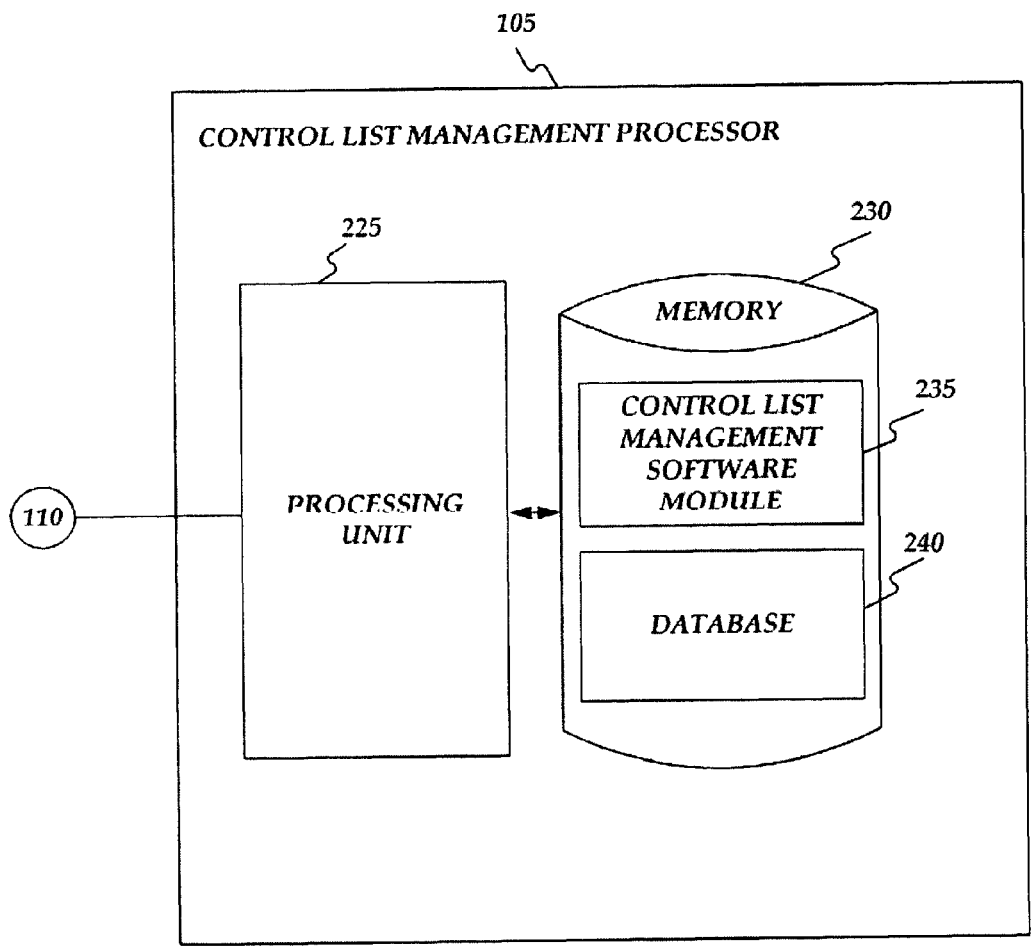
FIG. 2 is a block diagram of a control list management processor consistent.

FIG. 2 shows control list management processor 105 of FIG. 1 in more detail. As shown in FIG. 2, control list management processor 105 includes a processing unit 225 and a memory 230. Memory 230 includes a control list management processor software module 235 and a database 240. While executing on processing unit 225, software module 235 performs processes for providing control list management, including, for example, one or more of the stages of method 300 described below with respect to FIG. 3.

Control list management processor 105 ("the processor") included in system 100 may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

In addition to utilizing a wire line communications system in system 100, a wireless communications system, or a combination of wire line and wireless may be utilized in order to, for example, exchange web pages via the Internet, exchange e-mails via the Internet, or for utilizing other communications channels. Wireless can be defined as radio transmission via the airwaves. However, various other communication techniques can be used to provide wireless transmission, including infrared line of sight, cellular, microwave, satellite, packet radio, and spread spectrum radio. The processor in the wireless environment can be any mobile terminal, such as the mobile terminals described above. Wireless data may include, but is not limited to, paging, text messaging, e-mail, Internet access and other specialized data applications specifically excluding or including voice transmission. For example, the processor may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

Figure 3:
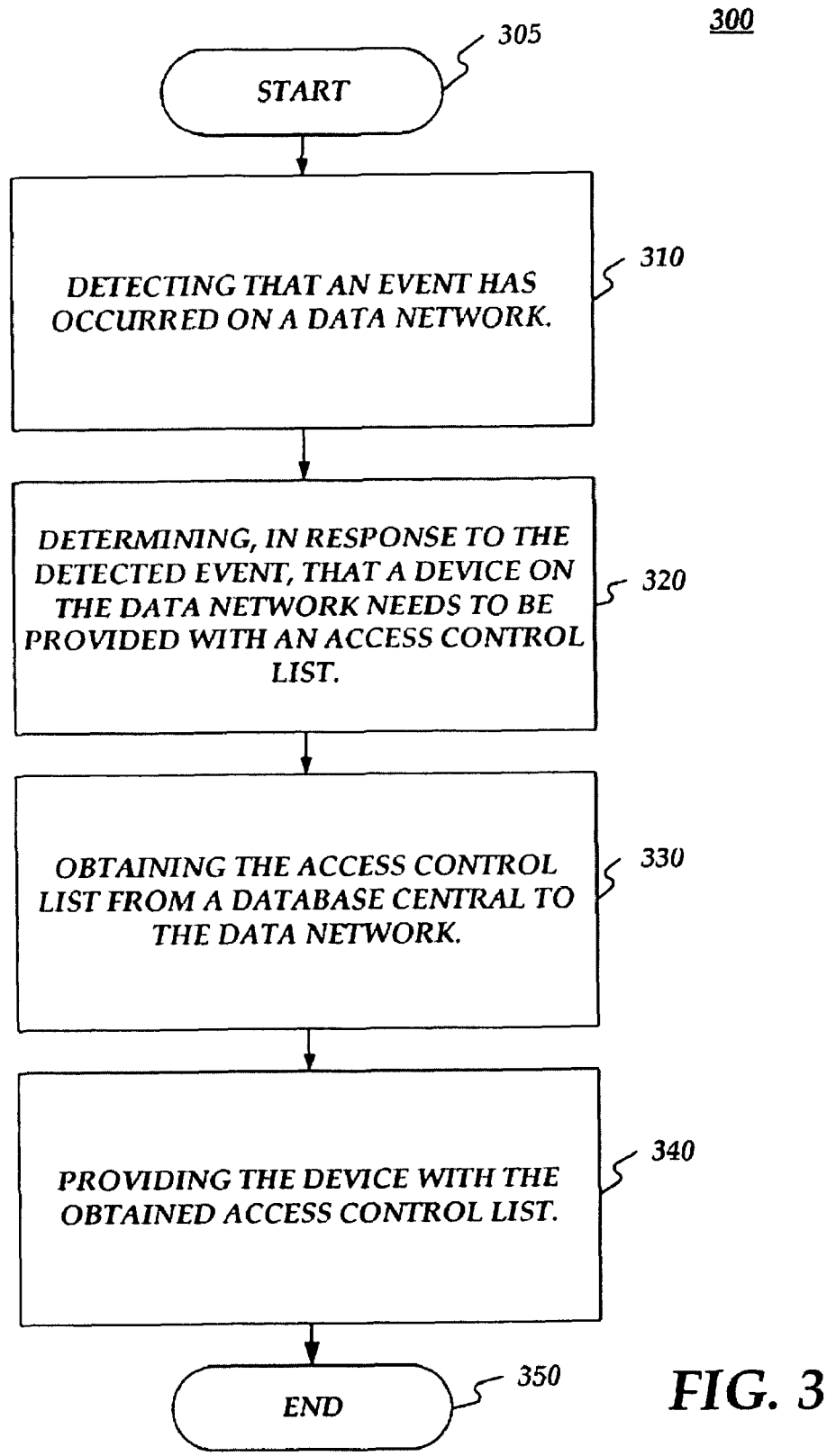
FIG. 3 is a flow chart of a method for providing control list management.

FIG. 3 is a flow chart setting forth the general stages involved in a method 300 consistent with an embodiment of the invention for providing control list management. Method 300 may be implemented using control list management processor 105 as described in more detail above with respect to FIG. 2. Ways to implement the stages of method 300 will be described in greater detail below. Method 300 may begin at starting block 305 and proceed to stage 310 where control list management processor 105 may detect that an event has occurred on a data network. The data network may comprise, but is not limited to, service provider network 102 as described above. The event may comprise a device on service provider network 102 being replaced or repaired. For example, a device on service provider network 102 may malfunction or otherwise need to be replaced or reprogrammed. If the device is replaced or reprogrammed, the device's current ACL may be erased. The device may comprise a core router, an edge router, a shadow router, an aggregating router, a switch, a modem, an access device, an aggregation device, a core network device, or a video/voice-over-ip device. Notwithstanding, the device may comprise an element that is capable of using an ACL.

Furthermore, the event may comprise a malicious attack such as, but not limited to, viruses or worms attacking service provider network 102. For example, control list management processor 105 may detect that a malicious attack is happening to service provider network 102. In response, control list management processor 105 may, for example, change a rule in the ACLs of all or most of the routers in service provider network 102. This rule change may be configured to stop the malicious activity. Consequently, embodiments of the invention may provide a fast way to change ACLs in a large number of devices in service provider network 102 quickly to mitigate to halt the malicious attack.

In addition, a service provider operating service provider network 102 may wish to reallocate bandwidth assigned to different types of services provided over service provider network 102 through the device. The different types of services may comprise, but are not limited to, video service, voice-over-IP service, and data service. For example, different portions of service provider network 102 may serve different types of users who use service provider network 102 for different services. One portion of service provider network 102 may have users who tend to use a large capacity of video services. Another portion of service provider network 102 may have users who tend to use a large capacity of data services. Furthermore this service mix my change over time. Consequently, the service provider may wish to reallocate priorities and bandwidths assigned to devices on service provider network 102.

From stage 310, where control list management processor 105 detects that the event has occurred on the data network, method 300 may advance to stage 320 where control list management processor 105 may determine, in response to the detected event, that the device on service provider network 102 needs to be provided with an ACL. For example, ACLs may reside in elements in service provider network 102 and may comprise a list of permissions attached to an object. The list may specify who or what is allowed to access the object and what operations may be allowed to be performed on the object. In an ACL, each entry in the list may specify a subject and an operation. In an ACL-based security model, when a subject requests to perform an operation on the object, a system may first check the ACL for an applicable entry in order to decide whether or not to proceed with the operation. For example, the entry (Alice, delete) on the ACL for file XYZ gives Alice permission to delete file XYZ. In other words, an ACL sits at the entrance of a device (e.g. a router) allowing only certain kinds of traffic and dropping other kinds of traffic. The ACL may control access to the device (and hence service provider network 102) and all associated proprietary information, for example, IP addresses, routing tables, etc.

In addition, ACLs may regulates quality of service. For example, the service provider may provide, over service provider network 102, video, voice-over-IP, and data services. Consequently, ACLs may manage the bandwidth by managing data packet queuing inside of routers or other devices in service provider network 102. For example, an ACL within a router in service provider network 102 may have rules that give video packets the highest priority, however, voice-over-IP may be given the second highest priority and data service may be given the lowest priority.

Once control list management processor 105 determines that the device on service provider network 102 needs to be provided with the ACL in stage 320, method 300 may continue to stage 330 where control list management processor 105 may obtain the ACL from a database central to service provider network 102. The database may comprise, but is not limited to, database 240. As stated above, ACLs comprise files including a number of allows or denies. Maintaining ACLs becomes complicated when you have varying ACLs applied to a large number of different devices on service provider network 102. Accordingly, database 240 may comprise a central repository for a plurality of ACLs that are know to work on particular devices or are know to work for devices of a certain type, group, or location on service provider network 102. In addition, database 240 may comprise a central repository where any or all of the ACLs made be modified and quickly reapplied to devices in service provider network 102. For example, one or even all of the devices in service provider network 102 may be the subject of a malicious attack. The source of the attack may be determined and changes to service provider network 102's ACL may be devised to combat the attack. These determined changes may be quickly applied to the plurality of ACLs in database 240. Once the determined changes are applied to database 240, the changed ACLs may then be reapplied to the devices in service provider network 102.

In addition, a device in service provider network 102 may be replaced or repaired. Either way, the device's ACL may have been erased during the repair or the replaced device may not have the correct ACL or may not have an ACL at all. Consequently, the ACL for this device may have been saved in database 240 and may be reapplied from database 240 to the device after repair or replacement. Moreover, the service provider may determine that the bandwidth allocation for this device needs to be modified. Consequently, the service provider may modify the device's ACL in database 240 and reapply the modified ACL to the device.

Moreover, devices in service provider network 102 may be designated as corresponding to one group or another. These groups may comprise, but are not limited to, a core router group, an edge router group, a shadow router group, and an aggregating router group. Consequently, the service provider may place into database 240 ACLs corresponding to each of the groups. Thus when a device on service provider network 102 needs an ACL, it may be determined to which group the device belongs. Then the ACL corresponding the determined group may be apply to the device.

Consistent with embodiments of the invention, control list management processor 105 may select the ACL from a plurality of ACLs in database 240. The ACL may be selected based upon a device type associated with the device. The device types may comprise, but are not limited to, a core router type, an edge router type, a shadow router type, and an aggregating router type. Furthermore, the access control may be selected based upon predetermined bandwidths assigned to different types of services provided over service provider network 102. The different types of services may comprise, but are not limited to, video, voice-over-IP, or data. Subsequent to obtaining the ACL, control list management processor 105 may display the ACL on a display device. Consequently, a user may be given the capability to edit the displayed ACL using control list management processor 105.

Consistent with embodiments of the invention, providing the device with the access control list may comprise importing a generic access control list template from external sources. Moreover, the access control list templates may be modified and exported to external sources for preserving them for future uses. Furthermore, providing the device with the access control list may comprise creating a specific access control list for a given router from a generic access control list template. A central location for IP addresses may be provided that may be used to create specific access control lists from generic control list templates. Providing the device with the access control list may comprise configuring or scheduling a configuration of a created access control list on a given router at a convenient time. The status of a configuration may be checked and appropriate action may be taken when a configuration fails. Moreover, providing the device with the access control list may comprise auditing or scheduling an audit of an access control list on a router/device and synchronizing with the version on the access control list management system.

Providing the device with the access control list may comprise trouble-shooting a misbehaving access control list and configuring the correct one on a router. A history of previous configurations may be kept and selection of a previously configured Access control list from the history may be allowed. and perform operations such as modify and configure. Moreover, an alert may be provided whenever an access control list is being modified without the knowledge of the system (e.g. system operator) and letting a user take appropriate actions such as audit or resynchronize.

After control list management processor 105 obtains the ACL from database 240 central to service provider network 102 in stage 330, method 300 may proceed to stage 340 where control list management processor 105 may provide the device with the obtained ACL. For example, control list management processor 105 may provide the device with the ACL over service provider network 102. Once control list management processor 105 provides the device with the obtained ACL in stage 340, method 300 may then end at stage 350.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing access control list management, the method comprising:
   detecting that an event has occurred on a network;
   determining, in response to the detected event, that a device on the network needs to be provided with an access control list;
   obtaining the access control list from a database central to the network, wherein obtaining the access control list from the database central to the network comprises selecting the access control list from a plurality of access control lists in the database based upon a device type associated with the device or based upon bandwidths assigned to different types of services provided over the network; and
   providing the device with the obtained access control list.

2. The method of claim 1, wherein detecting that an event has occurred on the network comprises detecting the event comprising at least one of the following: a malicious attack on the network and a violation of service assurance on the network.

3. The method of claim 1, wherein detecting that the event has occurred on the network comprises detecting the event comprising the device being replaced.

4. The method of claim 1, wherein detecting that the event has occurred on the network comprises detecting the event comprising the device being repaired.

5. The method of claim 1, wherein detecting that the event has occurred on the network comprises detecting the event comprising a service provider indicating a desire to reallocate bandwidth assigned to different types of services provided over the network through the device.

6. The method of claim 1, wherein detecting that the event has occurred on the network comprises detecting the event comprising a service provider indicating a desire to reallocate bandwidth assigned to different types of service providers over the network through the device, the different types of services comprising at least two of the following: video, voice-over IP, and data.

7. The method of claim 1, wherein determining, in response to the detected event, that the device on the network needs to be provided with the access control list comprises determining wherein the device comprises one of the following: an access device, an aggregation device, a core network device, and a video/voice-over-IP device.

8. The method of claim 1, wherein the device type comprises one of the following: a core router, an edge router, an access device, an aggregation router, and a video/voice-over-ip device.

9. The method of claim 1, wherein the bandwidths are one of the following: predetermined and dynamically determined.

10. The method of claim 1, wherein the different types of services comprise the following: video, voice-over-IP, and data, and the bandwidths are one of the following: predetermined and dynamically determined.

11. The method of claim 1, wherein providing the device with the access control list comprises providing the device with the access control list over the network.

12. The method of claim 1, further comprising, subsequent to obtaining the access control list, displaying the access control list.

13. The method of claim 12, further comprising providing a user the capability to edit the displayed access control list.

14. The method of claim 1, wherein obtaining the access control list comprises:
    obtaining the access control list comprising a template; and
    customizing the obtained access control list.

15. The method of claim 1, wherein detecting that the event has occurred on the network comprises detecting that the event has occurred on the network comprising one of the following: a data network and a communication network.

16. The method of claim 1, wherein providing the device with the access control list comprises importing a generic access control list template from an external source.

17. A non-transitory computer-readable medium which stores a set of instructions which when executed performs a method for providing access control list management, the method executed by the set of instructions comprising:
    detecting that an event has occurred on a network;
    determining, in response to the detected event, that a device on the network needs to be provided with an access control list;
    obtaining the access control list from a database central to the network, wherein obtaining the access control list from the database central to the network comprises selecting the access control list from a plurality of access control lists in the database based upon a device type associated with the device or based upon bandwidths assigned to different types of services provided over the network; and
    providing, over the network, the device with the access control list.

18. A system for providing access control list management, the system comprising:
    memory storage; and
    a processing unit coupled to the memory storage, wherein the processing unit is operative to:
        create a first access control list in response to user input;
        provide the access control list to a first device on a data network;
        determine that the access control list functions to a predetermined expectation in the first device; and
        provide the access control list to a second device on the data network in response to determining that the access control list functions to the predetermined expectation in the first device, the second device and the first device being of a same device type.

* * * * *